W. M. NISSLEY.
APPARATUS FOR AERATING FLOUR.
APPLICATION FILED OCT. 7, 1913.
1,134,757.
Patented Apr. 6, 1915
2 SHEETS—SHEET 2.
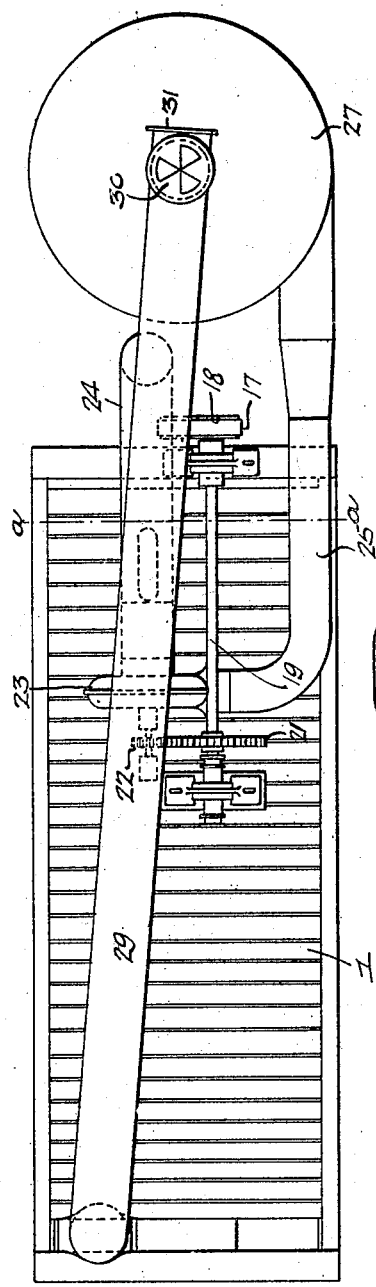
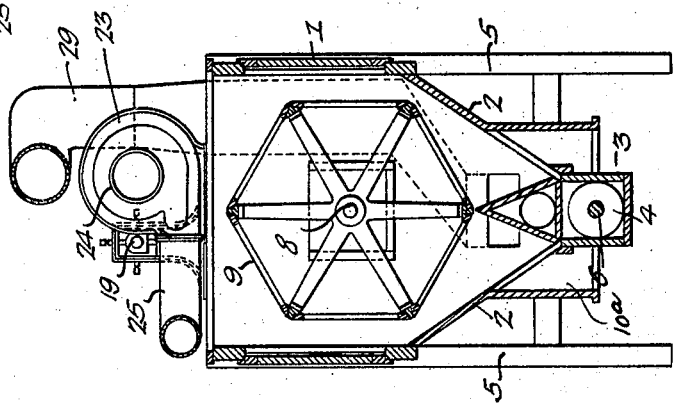
Inventor—
William M. Nissley.
by his Attorneys—
Howson & Howson
Witnesses—

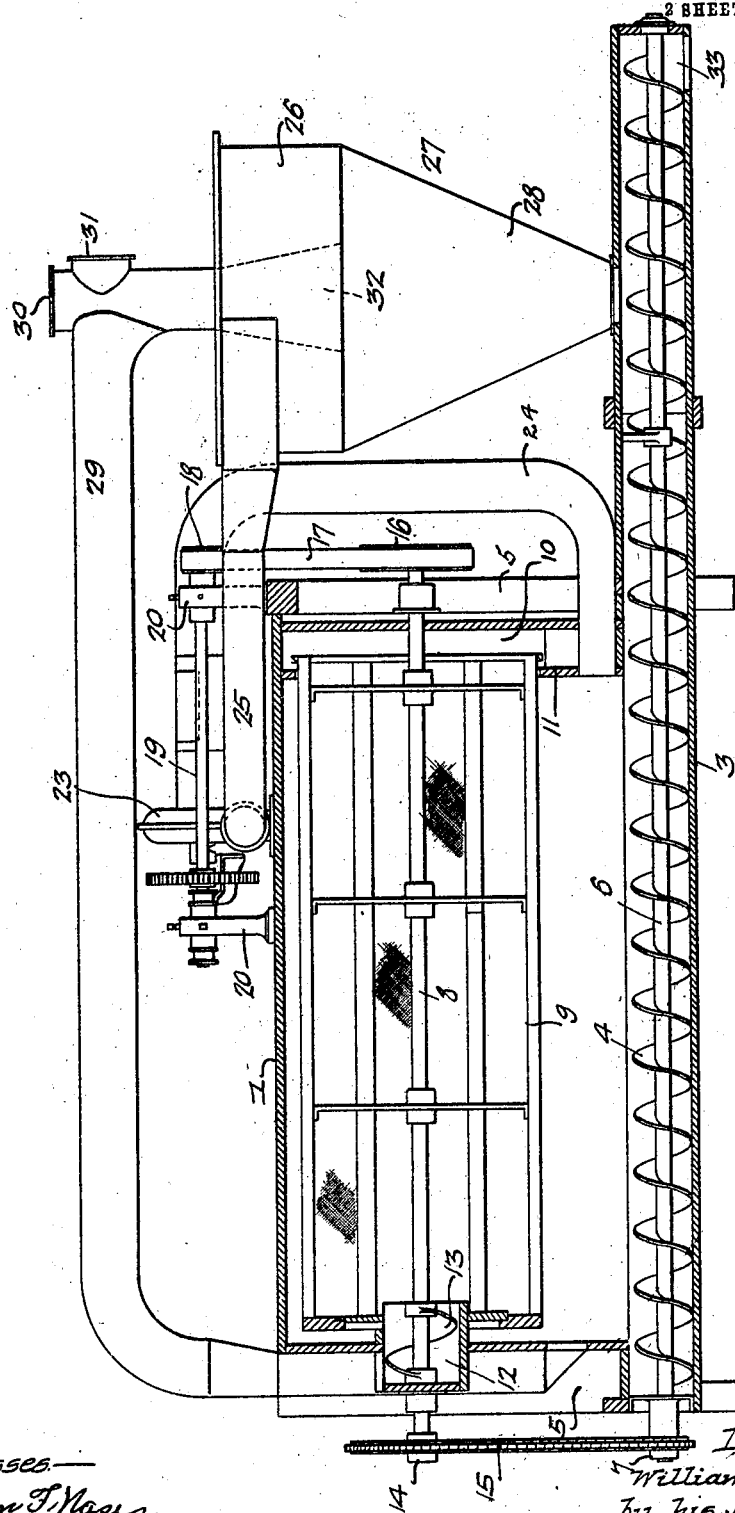

UNITED STATES PATENT OFFICE.

WILLIAM M. NISSLEY, OF PHILADELPHIA, PENNSYLVANIA.

APPARATUS FOR AERATING FLOUR.

1,134,757.  Specification of Letters Patent.  Patented Apr. 6, 1915.

Application filed October 7, 1913. Serial No. 793,863.

*To all whom it may concern:*

Be it known that I, WILLIAM M. NISSLEY, a citizen of the United States, residing in Philadelphia, Pennsylvania, have invented certain Improvements in Apparatus for Aerating Flour, of which the following is a specification.

One object of my invention is to provide a novel method for causing flour to mechanically take up or absorb relatively large amounts of air and at the same time be evened and blended with the utmost uniformity; the invention also contemplating a novel form of apparatus for carrying out this method of treatment.

I further desire to provide a relatively simple, compact and efficient device for aerating flour, whereby the latter is caused to repeatedly come into intimate association with currents or bodies of air, and is acted on mechanically to cause it to absorb relatively large quantities of the same.

These objects and other advantageous ends I secure as hereinafter set forth, reference being had to the accompanying drawings, in which:—

Figure 1 is a side elevation partly in vertical section, illustrating a machine constructed according to my invention and designed to carry out my method of treatment; Fig. 2 is a plan of the machine shown in Fig. 1, and Fig. 3 is a transverse vertical section on the line *a—a*, Fig. 2.

In the above drawings 1 represents an elongated casing whose upper portion is substantially rectangular in section but whose bottom has a hopper-like form indicated at 2 in Fig. 3 so that it terminates in an elongated trough 3 containing a screw conveyer 4. The casing and the others of the above mentioned parts are carried on supporting legs 5 and the spindle 6 of the conveyer is supported in suitable bearings as shown in Fig. 1, having fixed to one end a sprocket wheel 7.

Extending longitudinally within the casing is a shaft 8 upon which is fixed a reel 9 of a hexagonal section covered with a suitable bolting cloth. One end of this reel extends into and is open within a relatively narrow chamber 10 formed by a vertical partition 11 within the casing 1 adjacent one end thereof, and this chamber opens at the bottom into discharge spouts 10ª. At its opposite end the reel 9 is concentrically entered by a trough 12 containing a short length of screw conveyer 13 fixed to said shaft 8. The latter, at the end adjacent this feeding trough, has fixed to it a sprocket wheel 14 connected through a sprocket chain 15 with the sprocket wheel 7 on the conveyer shaft 6. The reel shaft 8 at that end opposite the sprocket wheel 14, has fixed to it a driving pulley 16 connected through a belt 17 with a pulley 18 on a counter shaft 19 driven from a suitable source of power, and this latter shaft is shown in the present instance, as mounted in bearings 20 carried on the top of the casing 1. Connected to the counter shaft 19 by a gear 21 and a pinion 22 is the driving shaft of a fan 23, whose intake, through a conduit 24, is connected with that part of the space below the reel immediately adjacent the chamber 10, while its outlet, through a pipe 25, is connected to discharge tangentially into the cylindrical upper part 26 of a separator 27. This upper portion communicates through a downwardly tapering part 28, with the conveyer trough 3.

From the separator 27 a pipe 29 extends to the lower portion of the casing 1 at that end thereof adjacent the supply conveyer 13, and this pipe is provided with two branches, having dampers 30 and 31 whereby greater or less quantities of air may be admitted to the closed air circuit made up by the air conduits and the casing. This pipe enters the top of the separator 27 and has a downwardly expanding portion 32 shown in dotted lines in Fig. 1, which terminates in a plane substantially coincident with the bottom of the cylindrical portion 26.

With this construction of apparatus power is applied to the shaft 19, thus driving the fan 23, turning the reel 9 and at the same time operating the conveyers 13 and 4. The flour to be aerated is then fed into trough 12, so that it is carried by the conveyer 13 into the reel, where it is rapidly and more or less violently agitated, partly by the revolution of said reel and partly by the air current, which being delivered from the fan through the pipe 25, separator 26 and pipe 29, enters said reel through the cloth covering thereof. A certain part of the flour in a highly aerated condition sifts through the cloth covering of the reel and falls into the trough 3, from whence it is removed by conveyer 4 to the discharge opening 33. Any large particles or lumps are delivered through the open end of the reel (which has a slight downward inclination toward said end) into the chamber 10, and falls from said chamber into the spouts 10ª which may deliver to any suitable receptacle. Still another part of the flour is carried into pipe 24, through the fan 23 and the pipe 25, into the upper part of the separator 27, where it is given a whirling motion and finally allowed to settle as the air enters and expands therein. A large portion of the flour thus entering falls through the conical bottom portion of the separator and entering the trough 3, is likewise carried to the discharge opening 33, while another part of said flour enters the wide-mouthed end 32 of the pipe 29. From this it is propelled by the air current therein to the front end of the casing 1, being delivered horizontally from the pipe into the hopper part 2 of said casing and directed thereby into the conveyer trough 3.

All of the above noted portions of the flour treated are brought into the most intimate contact with large bodies of air, so that their absorption of the same and their consequent thorough aeration is insured. Any desired receptacle may be placed to receive the aerated flour discharged from the opening 33 and under operating conditions the velocity of the air currents in the different parts of the apparatus, as well as the quantity of air admitted, may be conveniently adjusted by means of the dampers 30 and 31.

I have found that flour treated by my apparatus possesses in a high degree all the advantages arising from complete aeration, the bread, confectionery, etc., made therefrom being extremely light as well as of relatively large volume for a given weight; it being noted that such baked products are of the purest whiteness. Moreover, my method of treatment results in the most complete and uniform evening and blending of the various particles of which the flour is composed without the formation of so-called "dust."

I claim:

A flour aerating machine including a casing; a conveyer for removing flour from the bottom thereof; a reel in said casing; a fan having its intake connected to the lower part of one end of the casing; a separator connected to the outlet of said fan and discharging solid material into the conveyer; with an air conduit connecting the separator directly to the lower part of the second end of the casing.

In testimony whereof, I have signed my name to this specification, in the presence of two subscribing witnesses.

WILLIAM M. NISSLEY.

Witnesses:
WILLIAM E. BRADLEY,
WM. A. BARR.